March 25, 1924.
J. F. WAGNER
1,488,302
LAND ROLLER AND PULVERIZER
Filed April 27, 1922   2 Sheets-Sheet 2
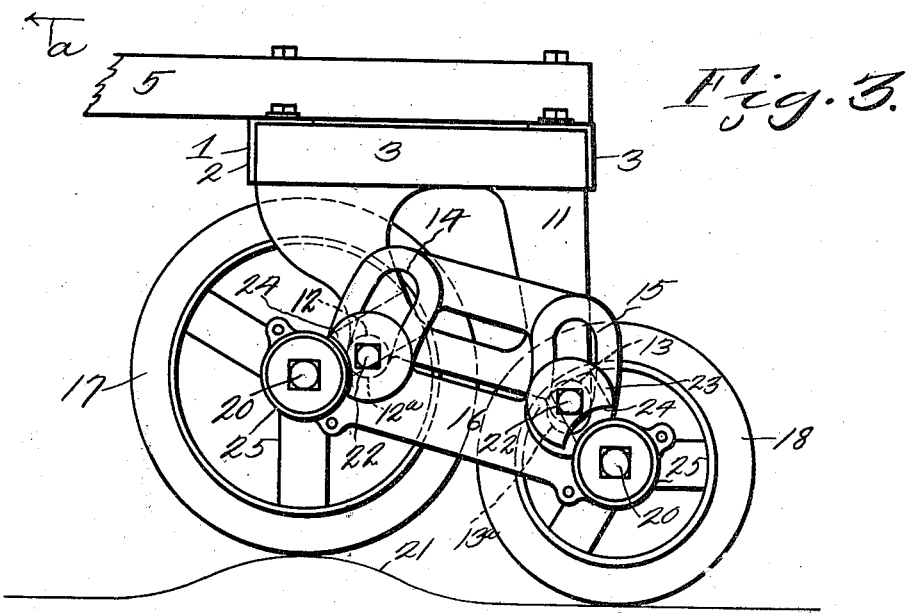
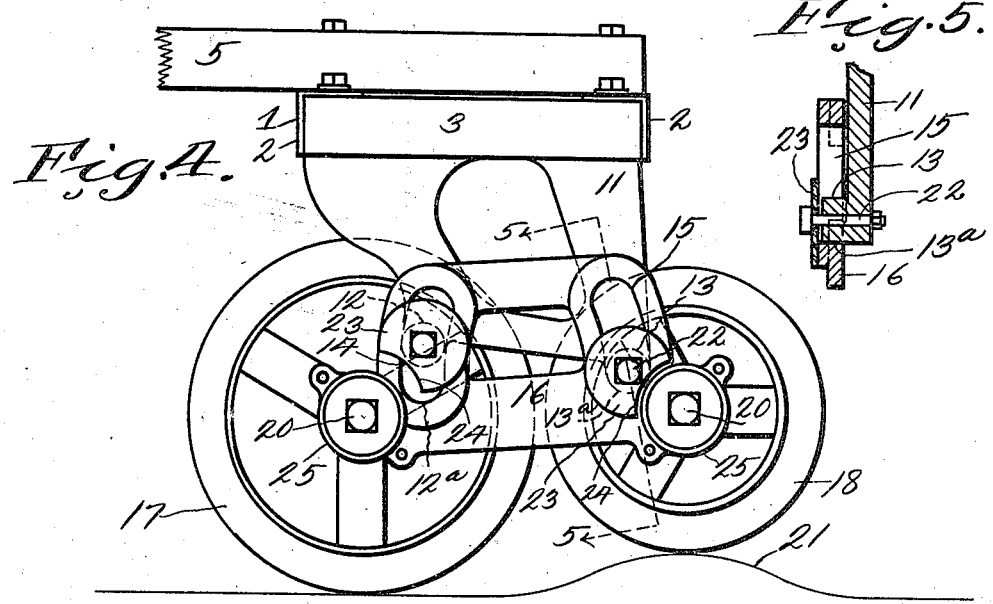
INVENTOR.
Joseph F. Wagner
BY
George J. Utech
ATTORNEY.

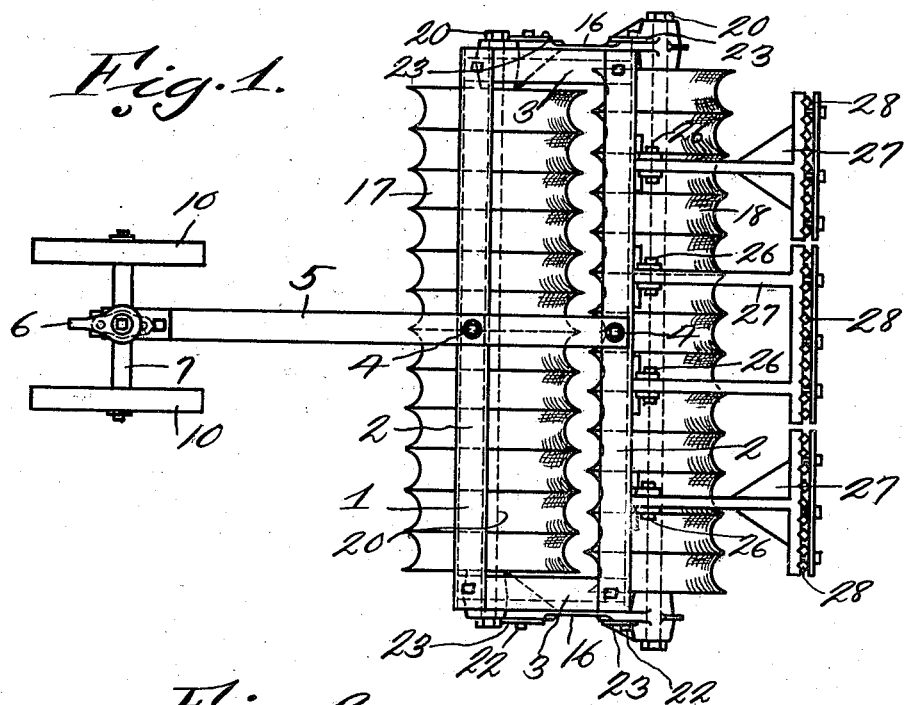
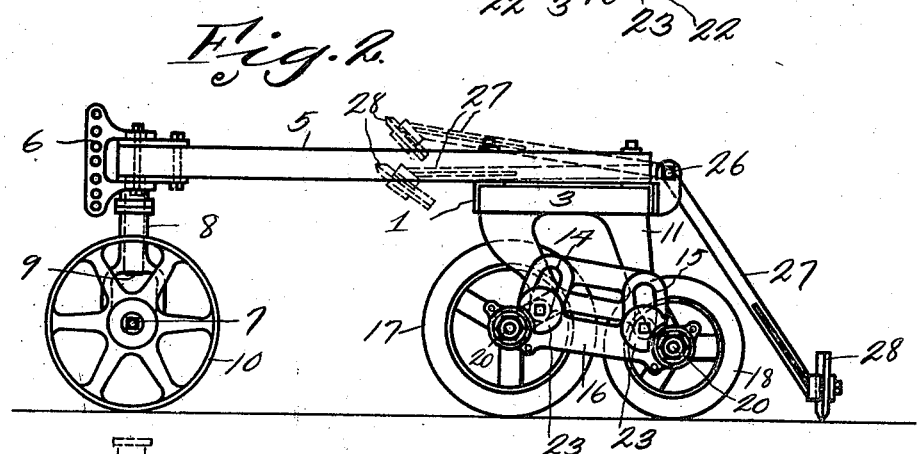
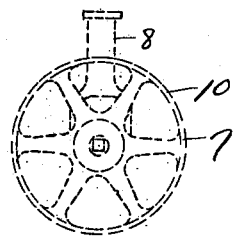

Patented Mar. 25, 1924.

1,488,302

UNITED STATES PATENT OFFICE.

JOSEPH F. WAGNER, OF SOUTH BEND, INDIANA.

LAND ROLLER AND PULVERIZER.

Application filed April 27, 1922. Serial No. 556,893.

*To all whom it may concern:*

Be it known that I, JOSEPH F. WAGNER, a citizen of the United States, residing at South Bend, in the county of St. Joseph and State of Indiana, have invented certain new and useful Improvements in Land Rollers and Pulverizers, of which the following is a specification.

The invention relates to land rollers and pulverizers and has for its object to provide a device of this character wherein a plurality of rollers, preferably corrugated, are rotatably mounted in bearings of yoke at the ends of the rollers, said yoke having segmentally shaped slots, the bottoms of which form bearings for bosses carried by the frame and forming means whereby the full weight of the implement will be on either roller as it passes over a clod of ground.

A further object is to provide a land roller and pulverizer wherein a plurality of rollers are used, said rollers being connected to the frame of the implement in such a manner that when either roller passes over a clod the entire weight of the implement will be on said roller.

A further object is to pivotally connect to the rear end of the frame rearwardly and downwardly extending harrow tooth carrying members, which members may be folded onto the frame.

A further object is to provide the frame with a forwardly extending tongue terminating in a clevis to which draft animals or a tractor may be attached. Also to provide a detachable horizontally pivoted supporting truck beneath the forward end of the tongue for supporting the tongue when draft animals are used.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the land roller and pulverizer, showing the harrow attachment.

Figure 2 is a side elevation of the device showing in dotted lines the harrow carrying members folded inwardly and onto the frame, and showing in dotted lines the truck removed.

Figure 3 is an enlarged side elevation of the rear end of the machine, showing the forward roller on a clod of earth and the weight of the frame entirely on said roller.

Figure 4 is a view similar to Figure 3 but showing the rear roller on a clod and the entire weight of the same on said roller.

Figure 5 is a detail sectional view taken on line 5—5 of Figure 4.

Referring to the drawings, the numeral 1 designates the oblong shaped frame of the machine, which frame comprises transversely disposed parallel bars 2, the ends of which are connected together by the bars 3. Secured to the bars 2 of the frame 1 by means of bolts 4 is a forwardly extending tongue 5, to the forward end of which is secured a clevis 6 adapted to have attached thereto in any suitable manner draft animals or a tractor. When the roller and pulverizer is drawn by draft animals a pivoted supporting truck 7 is disposed beneath the forward end of the tongue 5 and is pivotally connected thereto by means of the upwardly extending sleeve 8, which receives a downwardly extending shaft 9. It will be seen that the truck 7 which is provided with supporting wheels 10 will support the tongue 5 spaced from the ground in such a manner that the weight of the tongue will not be on the draft animals. However when the device is drawn by a tractor and the truck 7 is removed, the weight of the tongue is supported by the tractor, it being understood that the clevis 6 may be attached to the tractor or if so desired the truck may be removed and the tongue attached in any suitable manner.

Extending downwardly from the ends of the frame 1 are brackets 11, the lower ends of which are provided with outwardly extending bosses 12 and 13, the bosses 13 being in a lower horizontal plane than the bosses 12, the purpose of which will presently appear. Bosses 12 and 13 extend through and have slidable bearings in segmentally shaped slots 14 and 15 of yokes 16, which yokes move in a longitudinal vertical plane as the corrugated land rolling and pulverizing rollers 17 and 18 pass over uneven ground. The roller 17 is larger than the roller 18, however when the rollers are engaged with a flat surface as shown in Figure 2, the bosses 12 and 13 have bearings in the lower ends 12ª and 13ª of the segmentally shaped slots 14 and 15. However the rollers 17 and 18 are rotatably mounted on shafts 20 carried by the yokes 16, and it will be seen that as the yokes 16 move in a longitudinal vertical plane that the rollers will also move. When the machine is moving in the direction of the arrow a, Figure 3 and the roller 17 moves onto a clod 21, the boss 12 will remain in engagement with the lower end 12ª of the segmentally shaped slot 14 and will support the weight of the implement frame at a point where said weight will exert a downward pressure on the roller 17. However the rear ends of the yokes 16 which carry the roller 18 will move downwardly and the boss 13 will move upwardly in the segmentally shaped slot 15, thereby relieving the weight from the rear roller and allowing the full weight of the implement to be disposed on the roller 17 which is on the clod 21, thereby assuring a maximum crushing operation. When the rear roller 18 is on a clod 21 as shown in Figure 4, the boss 12 is out of engagement with the lower end 12ª of the slot 14, and the boss 13 is in engagement with the lower end of the slot 15, consequently the entire weight of the implement frame is disposed on the roller 18, thereby insuring a maximum crushing efficiency. The segmentally shaped slots 14 and 15 are concentric with the centers of the bosses 12 and 13 when said bosses are disposed in the lower ends of the slots, thereby allowing accurate guiding of the yokes 16 when either boss is in the bottom of the slots 14 or 15. By so arranging the slots, it will be seen that no matter how uneven the ground may be the entire weight of the implement will be shifted from roller to roller according to the maximum crushing action necessary for the raised roller, thereby insuring a maximum pulverizing operation. The bosses 12 and 13 are held in the slots 14 and 15 by means of bolts 22 which extend through the bosses and through washers 23 which engage the outer faces of the yokes, said washers may be cut away as at 24 for the reception of the bosses 25 of the yokes 16 through which the shafts 20 extend, thereby allowing the slots 14 and 15 to extend to points adjacent the bosses 25.

Pivotally connected at 26 to the rear frame bar 2 are rearwardly and downwardly extending harrow frames 27 provided with harrow teeth 28, and by means of which harrow teeth the ground as it is rolled and pulverized may be harrowed. When the harrows are not in use they are folded onto the frame 1 as shown in dotted lines in Figure 2, for instance when it is not desired to harrow the ground, or when transporting the machine from place to place.

From the above it will be seen that a land roller and pulverizer is provided wherein a plurality of rollers is used and the device so constructed that the full weight of the implement will be disposed on either roller when it is going over a clod and requires a maximum weight.

The invention having been set forth what is claimed as new and useful is:—

1. A land roller and pulverizer comprising a frame, downwardly extending brackets carried by said frame, outwardly extending bosses carried by said brackets, roller supporting yokes in slots of which the bosses are disposed, said bosses having bearings in the bottoms of said slots, rollers carried by said yokes, said bosses and slots forming means whereby upon elevation of one of said rollers the weight of the frame will be disposed on the elevated roller.

2. A land roller comprising a frame, ground engaging rollers disposed beneath said frame, the ends of said rollers being connected to yokes, upwardly extending slots carried by said yokes adjacent the rollers, downwardly extending brackets carried by the frame, said downwardly extending brackets being provided with bosses slidably mounted in the slots, said slots and bosses forming means whereby upon elevation of one of said rollers in relation to the other the weight of the frame will be disposed on the elevated roller.

3. A land roller comprising a frame, ground engaging rollers disposed beneath said frame, yokes carried by said rollers and provided with arcuately shaped slots adjacent the rollers, bosses carried by the frame and slidably mounted in the slots and normally disposed in the lower ends thereof, said slots being concentric with the centers of the bosses in adjacent slots when said bosses are in the bottoms of the slots.

4. In a land roller, the combination of a frame comprising successive roller carrying shafts, a weight frame above said first frame, a rocking joint between the frames including a plurality of transverse bearings located at points within the plane of the rollers and spaced from each other in the fore and aft direction, said bearings comprising members arcuately guidable in their movement.

5. In a land roller, the combination of a frame comprising successive roller carrying shafts, a weight frame above said first frame, members carried by one of said frames and extending through arcuate guide slots in the other frame, said members being guidable in their arcuate movement by the arcuate slots.

In testimony whereof I affix my signature.

JOSEPH F. WAGNER.